United States Patent
Hofmann et al.

(10) Patent No.: US 7,773,661 B2
(45) Date of Patent: Aug. 10, 2010

(54) METHOD AND APPARATUS FOR MONITORING A REDUNDANT (STANDBY) TRANSMITTER IN A RADIO COMMUNICATIONS SYSTEM

(75) Inventors: Heike Hofmann, Backnang (DE); Thomas Alberty, Backnang (DE); Khaled Fazel, Auenwald (DE); Volker Hespelt, Backnang (DE)

(73) Assignee: Ericsson AB, Stockholm (SE)

( * ) Notice: Subject to any disclaimer, the term of this patent is extended or adjusted under 35 U.S.C. 154(b) by 1606 days.

(21) Appl. No.: 10/482,794

(22) PCT Filed: Jun. 27, 2002

(86) PCT No.: PCT/IB02/03215

§ 371 (c)(1),
(2), (4) Date: Jul. 28, 2004

(87) PCT Pub. No.: WO03/005615

PCT Pub. Date: Jan. 16, 2003

(65) Prior Publication Data

US 2004/0247017 A1    Dec. 9, 2004

(30) Foreign Application Priority Data

Jul. 6, 2001    (EP) .................. 01116450

(51) Int. Cl.
*H04B 1/00*    (2006.01)
(52) U.S. Cl. .............. 375/142; 375/135; 375/146; 375/133; 455/103; 455/105; 455/92; 455/115.1; 455/500

(58) Field of Classification Search .............. 375/145, 375/130, 142, 150, 342, 148, 141, 233–236, 375/140, 147, 144, 285, 267, 347, 136, 133, 375/269, 279, 362, 355, 308, 334, 135, 146; 708/5, 8, 21, 404; 455/103, 105, 92, 115.1–115.3, 455/15, 500
See application file for complete search history.

(56) References Cited

U.S. PATENT DOCUMENTS 4,274,156 A    6/1981    Trefney
(Continued)

FOREIGN PATENT DOCUMENTS

EP    0 930 734 A1    7/1999
(Continued)

OTHER PUBLICATIONS

Ir. J. Meel , "introduction to spread spectrum (SS)", Nov. 1997-Nov. 1999, Sirius communication, pp. 2-13.*

(Continued)

*Primary Examiner*—David C Payne
*Assistant Examiner*—Rahel Guarino
(74) *Attorney, Agent, or Firm*—Kirschstein, et al.

(57) ABSTRACT

A method for monitoring a redundant (passive) transmitter, being, for example, part of a base station of a point-to-multipoint radio communications system transmits, during normal operation, a spread-spectrum signal over the redundant transmitter, the spread-spectrum signal being of low spectral power in comparison with data signals being transmitted by the active transmitter of the base station. One or more receivers are associated, for example, with terminal stations in communication with the base station and detect the presence of the spread-spectrum signal. If the spread-spectrum signal is not found to be present, the receivers provide an indication of this, and from this indication, a decision is made as to the integrity of the redundant transmitter.

27 Claims, 7 Drawing Sheets

U.S. PATENT DOCUMENTS

| | | | | |
|---|---|---|---|---|
| 5,022,047 | A * | 6/1991 | Dixon et al. | 375/151 |
| 5,287,388 | A * | 2/1994 | Ogura et al. | 375/344 |
| 5,790,591 | A * | 8/1998 | Gold et al. | 375/142 |
| 5,852,778 | A * | 12/1998 | Labedz | 455/423 |
| 5,960,040 | A * | 9/1999 | Cai et al. | 375/279 |
| 6,104,748 | A * | 8/2000 | Kaku | 375/235 |
| 6,160,841 | A * | 12/2000 | Stansell et al. | 375/148 |
| 6,188,876 | B1 | 2/2001 | Kim | |
| 6,392,960 | B1 * | 5/2002 | Seltzer et al. | 367/134 |
| 6,438,359 | B1 * | 8/2002 | Bossard et al. | 455/103 |
| 6,535,546 | B1 * | 3/2003 | Bethscheider et al. | 375/145 |
| 6,697,350 | B2 * | 2/2004 | Lomp | 370/342 |
| 2001/0002919 | A1 * | 6/2001 | Sourour et al. | 375/150 |

FOREIGN PATENT DOCUMENTS

| | | |
|---|---|---|
| JP | 3247022 | 11/1991 |

OTHER PUBLICATIONS

R. J. Meel, "introduction to spread spectrum (SS)", Nov. 1997-Nov. 1999, Sirius communication, pp. 2-13.*

* cited by examiner

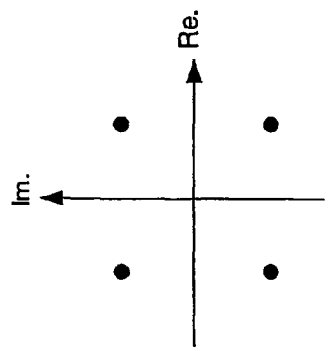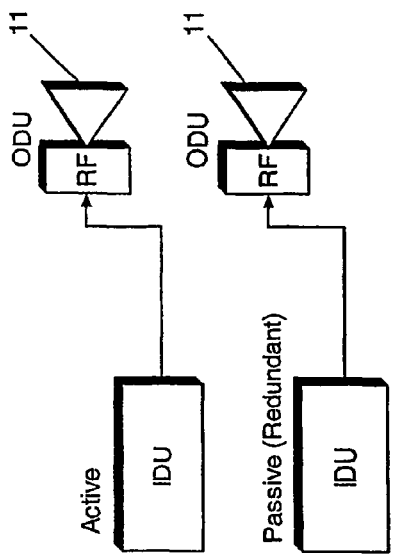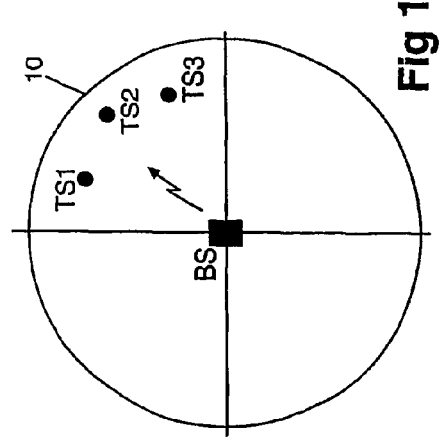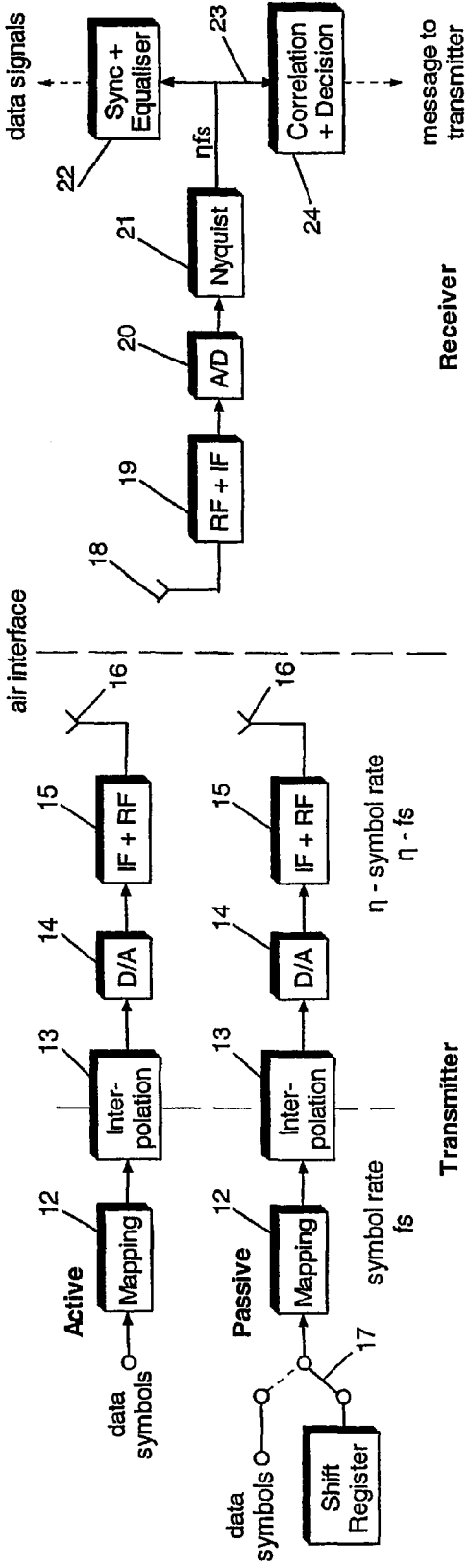

METHOD AND APPARATUS FOR MONITORING A REDUNDANT (STANDBY) TRANSMITTER IN A RADIO COMMUNICATIONS SYSTEM

BACKGROUND OF THE INVENTION

This invention relates to a method and apparatus for monitoring a redundant (or standby) transmitter in a radio communications system having an active transmitter and one or more receivers. The invention is especially, although not exclusively, concerned with point-to-multipoint radio communications systems.

Radio transmission systems are often used to transmit data. A common scenario is the transmission of data from a base station to a number of receivers in a point-to-multipoint system. Such an arrangement is shown in FIG. 1, in which the base station (BS) communicates with a number of terminal stations (TS1-TS3) in one particular sector 10 of the base station's range. To reduce the impact of equipment failure (i.e., to increase the availability of a radio link) it is known practice to install duplicate equipment (standby equipment) that is redundant whilst the equipment functions correctly. In the case of a point-to-multipoint system, since the integrity of the base-station transmitter facility is of prime importance, it is that transmitter that is normally duplicated. This is illustrated in FIG. 2, in which the active and passive (redundant or standby) transmitters are basically identical and comprise an indoor part (IDU) and a cable-linked outdoor part (ODU). The ODU includes an RF stage and an antenna 11. Where failure of the active transmitter occurs, the redundant (standby) transmitter can take over the transmission of data.

There is the possibility, however, that the redundant transmitter will fail before the active transmitter fails. This is especially likely when the redundant transmitter is permanently energised (so-called "hot standby"). Failure then has a probability of 50%. If failure of the redundant transmitter is not detected, the redundancy is lost and, in the event that the active equipment also fails, data transmission is completely lost. This is obviously particularly disastrous in point-to-multipoint systems, since a whole sector can be lost with the failure of the base station.

There is, therefore, a need to monitor the integrity of the redundant transmitter in such a communications system.

The supervision of a redundant transmitter, however, poses an acute problem, as a transmitter can only be fully tested by transmitting a signal, which in turn may adversely affect the transmission of data.

At the present time, three methods of supervision are known:

- the data signal uses both transmitters (active and redundant) at different frequencies or time slots. This is possible only in point-to-multipoint systems if the data signal in the downlink is "bursty", i.e. if different time slots are employed for different terminal stations, or if it is an FDM (Frequency-Division Multiplex) signal, i.e. different frequency bands are used for different terminal stations.
- a pilot signal is transmitted over the redundant transmitter, either in the time or frequency domain. This is, however, a waste of resources.
- the outdoor unit (ODU) is self-monitoring, i.e. the supervision is performed only at the analogue part of the transmitter, for example by monitoring the oscillators. This requires a special development of the redundant ODU and a digital link between the redundant ODU and IDU (indoor unit). Further, this involves additional hardware outlay, which can be costly.

Since in the case of a TDMA (Time-Division Multiple Access) point-to-multipoint system the downlink signal is time-continuous, the first method for supervision cannot be used. The other two have the drawback that they are inefficient.

SUMMARY OF THE INVENTION

According to a first aspect of the present invention there is provided a method for monitoring the redundant transmitter of a radio communications system, which system comprises an active transmitter for the transmission of data signals to one or more receivers, the method being characterised by the steps of: during normal operation transmitting over the redundant transmitter a spread-spectrum signal within the frequency band of the data signal, said spread-spectrum (SS) signal being of low spectral power in comparison with said data signals; and at one or more of the one or more receivers, detecting the presence of the spread-spectrum signal, the absence thereof being taken to indicate the non-integrity of the redundant transmitter.

The invention provides the advantage that a pilot (or monitoring) signal can be transmitted over the redundant transmitter without disturbing the data signal being transmitted by the active transmitter. At the receiver, as far as the data signal is concerned the SS signal is registered merely as additional white noise and is therefore negligible. The receiver, however, also contains means for specifically detecting the SS signal and, if it is not present, it can be concluded that the redundant transmitter is defective.

A particular advantage of the invention is its universal applicability (it does not depend on the nature of the data signal), the fact that it does not waste time or frequency resources, and its susceptibility to digital realisation, so that it is also cost-effective. Further, the ODU does not have to be specially designed and no measurement setup or link between the ODU and the IDU has to be provided.

Preferably detection for the presence of the spread-spectrum signal is performed by a process of correlation.

Advantageously detection is performed by a process of cross-correlation, the spread-spectrum signal being provided by feeding the redundant transmitter with a first pseudo-noise signal and the cross-correlation being performed between the received signal and a second pseudo-noise signal, the second pseudo-noise signal having the same characteristics as the first. With such a method the first pseudo-noise signal is preferably passed through the same components in the redundant transmitter as would data signals, were the redundant transmitter called upon to take over from the active transmitter.

Advantageously, and in order to compensate for a timing phase error in respect of the spread-spectrum signal, oversampling of the received signal is performed in the receiver.

Preferably, and in order to compensate for the effects of a frequency offset existing between the active and redundant transmitters and to take into account the narrow allowable window of offset which the correlation of a long pseudo-noise sequence can tolerate, the received signal is subjected to a stepped sweeping operation, wherein the received function is multiplied by a complex factor having the form $\exp\{j2\pi k \delta_S / \eta\}$, where $j=\sqrt{-1}$, $k$ is the sampling index, $\eta$ is an oversampling factor and $\delta_S$ are the sweeping steps, scaled by the symbol rate.

Preferably the sweeping steps $\delta_S$ are chosen such as to cover all values of the frequency offset and are advantageously chosen such as to compensate for a drift of the frequency offset with time.

Preferably the cross-correlation is two-dimensional, and is calculated for all sweeping steps $\delta_S$ and for $\eta N_{pn}$ time steps, where $\eta$ is the oversampling factor and $N_{pn}$ is the length of the pseudo-noise sequence. Advantageously a maximum of the absolute value of the cross-correlation result is employed to determine the integrity of the redundant transmitter.

In one embodiment a maximum of the squared absolute value of the cross-correlation result is employed to determine the integrity of the redundant transmitter.

Preferably the correlation calculation is performed by a part-serial, part-parallel processing of the sampled data. With such a method the processing preferably takes the form of a processing of a first group ($N_S$) of the $\eta N_{pn}$ points in parallel for successive values of $\delta_S$, then of a second group ($N_S$) of the $\eta N_{pn}$ points in parallel for successive values of $\delta_S$, and so on until all $\eta N_{pn}$ points have been covered.

In a preferred application of the method of the present invention the radio communications system comprises two or more receivers, each of which provides an indication of the presence or absence of the spread-spectrum signal, the decision as to the non-integrity of the redundant transmitter being taken on the basis of the indications of a predetermined number of the two or more receivers.

Advantageously the decision is taken on the basis of a majority vote.

Alternatively the radio communications system comprises one receiver and the indication of non-detection of the spread-spectrum signal at that receiver is taken as an indication of the non-integrity of the redundant transmitter.

The present invention finds particular application to point-to-multipoint radio communications system in which the active and redundant transmitters are part of a base station, and the receivers are terminal stations, of that point-to-multipoint system. Preferably the point-to-multipoint system comprises a TDMA (Time-Division Multiple Access), a FDMA (Frequency-Division Multiple Access) or a CDMA (Code-Division Multiple Access) system.

Alternatively the invention can be applied to point-to-point systems incorporating a redundant or standby transmitter.

According to a second aspect of the invention there is provided apparatus for monitoring the redundant transmitter of a radio transmission system, which system comprises an active transmitter for the transmission of data signals to one or more receivers, the apparatus comprising: means for generating a pseudo-noise signal; means for applying said pseudo-noise signal to an input of the redundant transmitter, the transmitter thereby transmitting a spread-spectrum signal having a low spectral power in comparison with said data signals; and means in one or more of the one or more receivers for detecting the presence of the spread-spectrum signal.

Advantageously one or more receivers includes correlator means for the cross-correlation of the received signal.

Preferably the one or more receivers further comprises oversampling means for the compensation of a timing phase error in respect of the spread-spectrum signal.

Advantageously the apparatus further comprises sweeping means for subjecting the received signal to a frequency-sweeping operation, the sweeping means comprising a multiplier means for multiplying the received signal by a complex factor having the form $\exp\{j2\pi k \delta_S/\eta\}$, where $j=\sqrt{-1}$, k is the sampling index, $\eta$ is an oversampling factor and $\delta_S$ are the sweeping steps, scaled by the symbol rate.

Preferably the correlator means is connected to a maximum-deriving means for deriving a maximum value of the correlator output. With such an arrangement the maximum-deriving means is advantageously arranged to derive the maximum of the absolute value of the correlator output or the maximum of the square of the absolute value of the correlator output.

According to a further aspect of the invention a radio communications system comprises an active and a redundant transmitter, two or more receivers and an apparatus in accordance with the second aspect of the invention.

Preferably the monitoring apparatus of such a communications system comprises a decision-making means fed by the indications of redundant-transmitter integrity delivered by the receivers. Preferably the decision-making means makes a decision on the basis of majority voting among the receivers.

The communications system preferable comprises a point-to-multipoint system such as a TDM/TDMA (Time Division Multiplex in a downlink/Time Division Multiple Access in an uplink direction) system, an FDM/FDMA (Frequency Division Multiplex in a downlink/Frequency Division Multiple Access in an uplink direction) system or a CDM/CDMA (Code Division Multiplex in a downlink/Code Division Multiple Access in an uplink direction) system.

BRIEF DESCRIPTION OF THE DRAWINGS

An embodiment of the invention will now be described, by way of example only, with reference to the drawings, of which:

FIG. 1 is a simplified diagram of a point-to-multipoint radio communications system;

FIG. 2 shows the use of an active and passive (redundant) transmitter in a base station of the point-to-multipoint system of FIG. 1;

FIG. 3 is a block diagram of a radio communications system employing the monitoring method in accordance with the invention;

FIG. 4 is a complex-plane diagram illustrating the action of the mapper shown in FIG. 3;

DETAILED DESCRIPTION OF THE PREFERRED EMBODIMENTS

Figure 5:
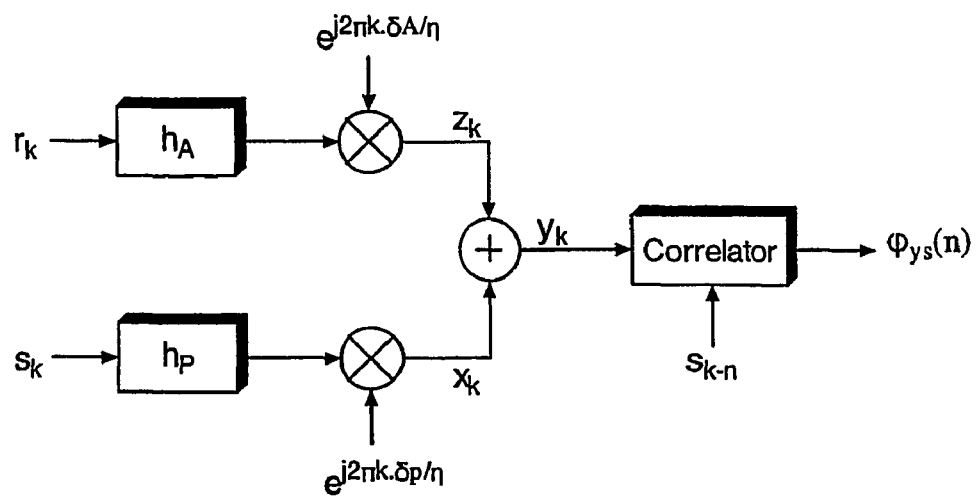
FIG. 5 is an equivalent model of the communications system of FIG. 3.

Referring now to FIG. 3, FIG. 3 is a block diagram of a radio link featuring the monitoring method of the invention and includes both active and passive (redundant/standby) paths in the transmitter and the receiver. The transmission stages are the same in both paths and include a mapping stage 12, an interpolation stage 13, a digital-to-analogue converter stage 14 and an IF/RF output stage 15 which feeds an antenna 16. The modulation scheme which is used is a linear one, e.g. quadrature amplitude modulation (QAM).

Describing the function of the illustrated components in a little more detail, the bits (data symbols) which are to be transmitted are first mapped into channel symbols in the mapper 12. Assuming, for example, that a 4QAM or a QPSK (Quadrature Phase Shift Keying) modulation scheme is employed, the channel symbols are made to correspond to one of the four points in the complex plane shown in FIG. 4, i.e. two bits of the wanted data bit stream (symbol stream) to be transmitted are mapped onto one of these four symbols, yielding for that symbol two complex values (real and imaginary) at the output of the mapper. There then occurs a pulse-shaping process using a square-root Nyquist filter (interpolation stage) 13. The output of this filter 13 is sampled and converted into analogue form (14). In order to satisfy the sampling theorem, the sampling rate must be at least twice the channel symbol rate, and therefore an oversampling factor-of-$\eta$ interpolation function is performed, which is included in the pulse-shaping block (interpolation stage) 13. Finally, the baseband signal is up converted to IF and then to RF (15) before being transmitted from the antenna 16.

The data signal is transmitted over the active path.

While the redundant transmission path is substantially identical to the active path in all hitherto described respects, in one respect it is different: at the input of the mapper 12 a switch 17 is provided which makes it possible during normal operation to feed in a spread-spectrum (SS) signal at symbol rate, but, following failure of the active transmitter, to take over transmission of the data signal.

The SS signal consists of a long pseudo-noise (PN) sequence (±1 in amplitude) of length $N_{pn}$. The signal is up sampled with an oversampling factor $\eta$. As the digital filters and analogue components in the active and passive line card and ODU are essentially the same, the SS signal will have the same bandwidth as the data signal. However at the air interface its spectral density will be significantly lower than the density of the data signal (about 30-35 dB lower). Thus, for the data signal the PN sequence appears only as an additional, but negligible, white noise.

At the receiver side the signal received at a receiver antenna 18 is down converted again to baseband (19) and changed from analogue form to digital (20), following which a corresponding interpolation step is performed (21), the resulting signal being, in accordance with conventional methods, subject to a synchronisation and equalisation process (22), thereby producing the data signal originally transmitted by the active transmitter. In addition to this, however, steps are taken to detect the SS signal that is being transmitted by the redundant (passive) transmitter. This is achieved by correlating the received signal with the same PN sequence that was used by the transmitter. This is shown by the separate branch 23, which is taken to a correlation stage 24, the result of the correlation process being used to make a decision as to whether or not the SS signal was received. (It is noted that the received signal comprises both the transmitted data signal and the SS signal). In practice it is the maximum of the absolute value of the correlation which is used to form the decision.

The decision stage (24) draws the following conclusions:

(a) where both data and SS signals are registered, the ODUs (11, 15, 16) of both active and passive transmitters are deemed to be intact;

(b) where the data signal only is registered, the redundant ODU is considered to be defective;

(c) where the SS signal only is registered, the active ODU is taken to have failed (this applies to the time just before redundancy switching takes place). The switching over of control from active unit to redundant unit is not addressed by this present patent.

This simple approach is rendered more complex by the need to solve two problems which have been found to arise in a practical system:

(1) The frequency synchronisation which can normally be employed in the case of the data signal is missing in the case of the SS signal. This causes a degradation of the correlator output of the form $\sin(\pi\delta M/\eta)/(\pi\delta M/\eta)$ where $\delta$ is the frequency offset scaled by the symbol rate, M is the correlation length and $\eta$ is the oversampling factor.

(2) There is a similarly missing timing synchronisation for the SS signal, which also causes a degradation of the correlator output, depending on the oversampling factor: the larger the factor $\eta$, the smaller the degradation.

Even if a frequency and timing phase synchronisation is provided for the radio link, it is optimised for the active path only. As the oscillators in the active and passive IDU and ODU are not coupled, the frequency offsets will not be the same. Furthermore, the radio channels for the data and SS signal will not be the same. The sampling phase at the receiver will be optimised for the data signal, so that there can be a timing phase error for the SS signal.

The impact of frequency offset and timing phase error on the correlation is now examined and the solution presented. A baseband signal representation is assumed.

The effect of a frequency offset in the time domain is a phase rotation of every sample by a constant factor $$2\pi \frac{\delta}{\eta}$$

with respect to the previous sample:

$$s'_k = s_k \cdot \exp\left(j \cdot 2\pi \cdot k \frac{\Delta f}{f_A}\right) = s_k \cdot \exp\left(j \cdot 2\pi \cdot k \frac{\delta}{\eta}\right) \quad (2.1)$$

where $\eta = f_A/f_S$ is the oversampling factor, $\delta = \Delta f/f_S$ is the frequency offset $\Delta f$ scaled to the symbol rate $f_S$ and $f_A$ is the sampling rate.

Referring to FIG. 5 there is shown an equivalent model of the communications system of FIG. 3 in which $r_k$ and $s_k$ are the data signal and the SS signal respectively, both oversampled with $\eta$. Let $h_A$ and $h_P$ be the impulse responses of the whole active and passive transmission path, respectively, and $\delta_A$ and $\delta_P$ the resulting frequency offsets scaled to the symbol rate. The simplification of concentrating all filters at the beginning of the transmission path and all frequency offsets at the end is based on the fact that filtering and frequency offset can be interchanged if the filter bandwidth of the receiver filter is large compared to the frequency offset and if the frequency offset is small compared to changes of the filter function in the frequency domain.

Let M be the correlation length and $k_o$ an arbitrary starting index. The output $\phi_{ys}(n)$ of the correlator is:

$$\varphi_{ys}(n) = \frac{1}{M} \cdot \sum_{k=k_0}^{k_0+M-1} y_k \cdot s_{k-n}^* \tag{2.2}$$

Expressing $y_k$ by convolution we have:

$$\varphi_{ys}(n) = \sum_l h_{Pl} \cdot \frac{1}{M} \cdot \sum_{k=k_0}^{k_0+M-1} s_{k-l} \cdot s_{k-n}^* \cdot \exp\left(j \cdot 2\pi \cdot k \frac{\delta_P}{\eta}\right) + \\ \sum_l h_{Al} \cdot \frac{1}{M} \cdot \sum_{k=k_0}^{k_0+M-1} r_{k-l} \cdot s_{k-n}^* \cdot \exp\left(j \cdot 2\pi \cdot k \frac{\delta_A}{\eta}\right) \tag{2.3}$$

The mean value of the correlator output is therefore (assuming that $s_k$ and $r_k$ are uncorrelated):

$$E[\varphi_{ys}(n)] = \sigma_s^2 \cdot h_{Pn} \cdot \frac{1}{M} \cdot \sum_{k=k_0}^{k_0+M-1} \exp\left(j \cdot 2\pi \cdot k \frac{\delta_P}{\eta}\right) \tag{2.4}$$

$\sigma_S^2$ is the variance (or power) of the SS signal. Transforming the sum and considering only the absolute value, we have finally:

$$|E[\varphi_{ys}(n)]| = \sigma_s^2 \cdot |h_{Pn}| \cdot \left|si\left(\pi \frac{\delta_P}{\eta} M\right)\right| \tag{2.5}$$

where $si(x)=\sin(x)/x$. This is a very important result. It shows that, when a frequency offset is present, the "usual" correlator output $\sigma_S^2 h_{P_n}$ is distorted by a si-function of the product $$\frac{\delta_P}{\eta} M$$

Figure 6:
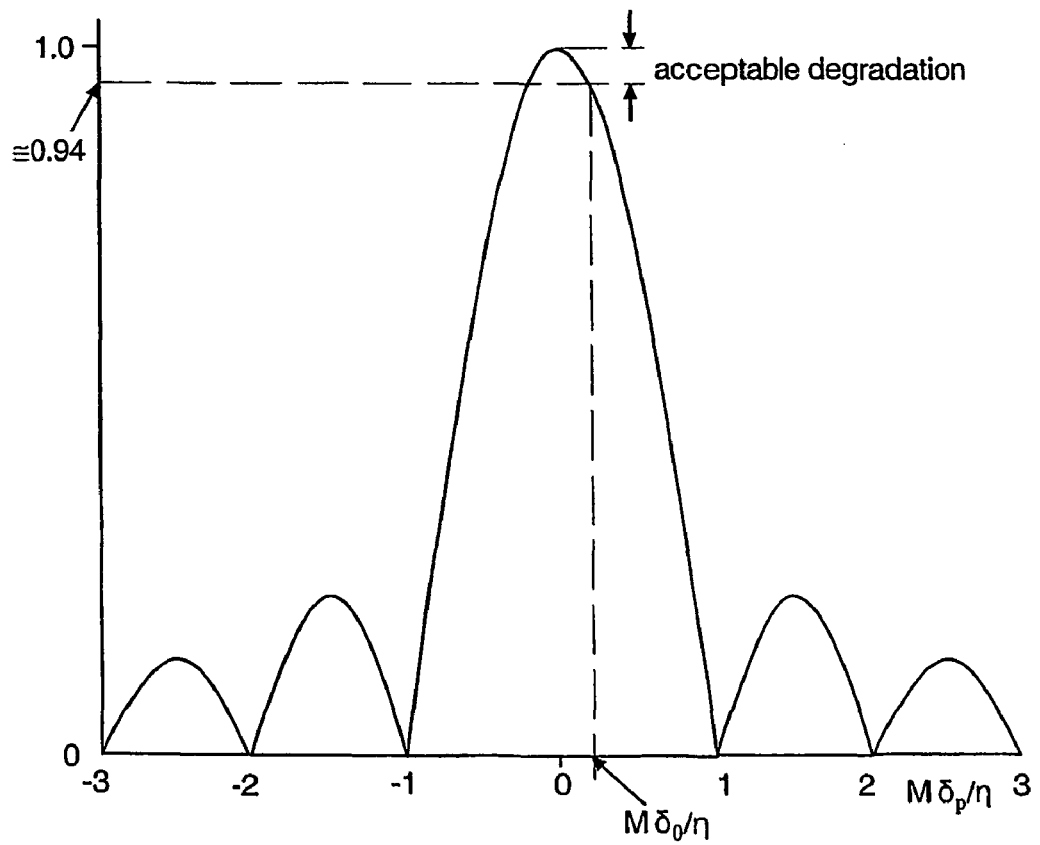
FIG. 6 is a sin(x)/x diagram showing the effect of the presence of a frequency offset between the active and redundant transmitters.

(see also FIG. 6). Obviously, for large M, si $$\left(\frac{\delta_P}{\eta} M\right)$$

will be close to zero and the correlation $\phi_{ys}$ will become very small. In this case, the SS signal would not be detected. However, there is a region for $\delta_P$ where detection is possible, i.e. where the degradation can be tolerated. Unfortunately, the correlation length has to be quite large in order to detect the SS signal with its very low power, so the acceptable $\delta_P$ is too small.

Figure 7:
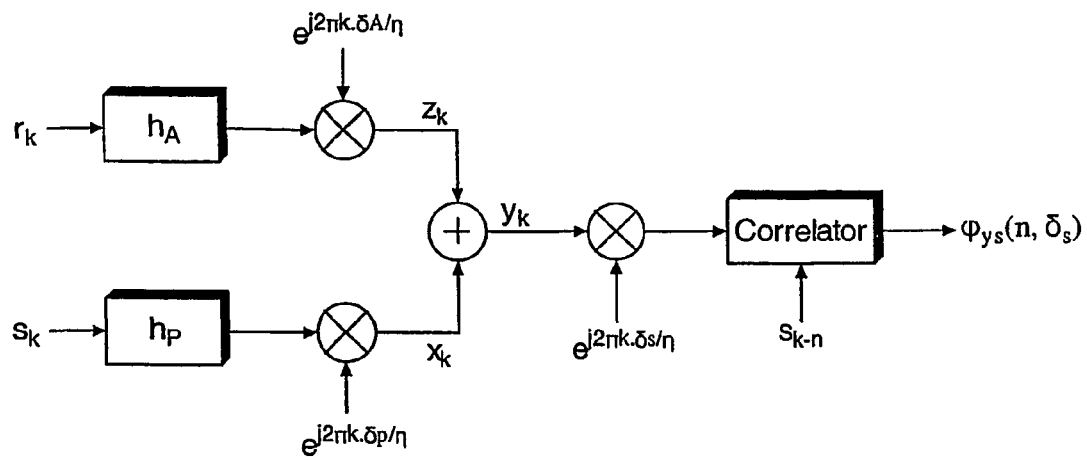
FIG. 7 is the equivalent model of FIG. 5, but including a sweeping technique for compensating for the effects of frequency offset.

The proposed solution according to the invention is to carry out a "sweeping" process, where an intentional and stepwise changing frequency offset $\delta_S$ is introduced before the correlator. The correlation is calculated for a number $N_d$ of offsets, thus covering the whole range of $\delta_P$. FIG. 7 reproduces the equivalent model of FIG. 5, but this time with the additional sweeping function. It should be noted that the correlator output $\phi_{ys}(n, \delta_S)$ is now two-dimensional, being a function of $\eta$ and $\delta_S$.

Figure 8:
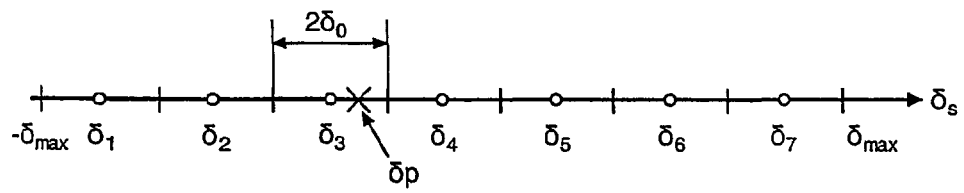
FIG. 8 is a further illustration of the sweeping technique mentioned in connection with FIG. 7.

Let $\delta_0$ be the frequency offset with acceptable degradation. If the step size is $2\delta_0$, then one of the resulting offsets $|\delta_P+\delta_S(i_0)| \leq \delta_0$ so that the degradation of $E[\phi_{ys}(n, \delta_S(i_0))]$ will be sufficiently small (see FIGS. 6 and 8).

Figure 9:
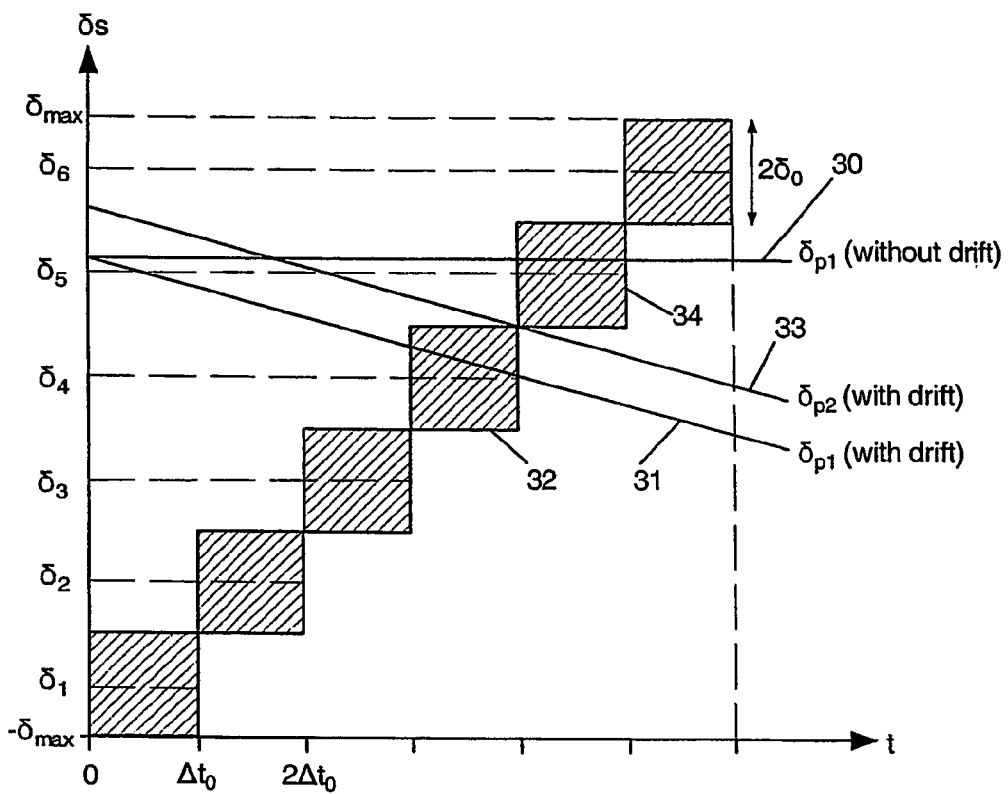
FIGS. 9 and 10 are, respectively, a diagram illustrating the deleterious effect of frequency-offset drift and a method of compensating for this effect.

The sweeping function is illustrated in graphical form in FIG. 9. Here the full range of discrete offsets, $\delta_1 \ldots \delta_6$ (it is assumed in this example that $N_d=6$), is applied in turn, each offset being effective for an actual frequency offset of $\pm\delta_0$ about that applied offset. Each $\delta_S$ is applied for a time $\Delta t_0$, this being the time over which correlation takes place for that value of $\delta_S$.

The effect of this offset compensation can be illustrated also by a numerical example. Assume $\delta_P$ covers a range from −5 to +5, then the sweeping steps must also vary from −5 to +5. If $\delta_0=0.5$, the step size is 1 and $\delta_S(i)$ assumes the values −5, −4, −3, . . . 3, 4, 5. So if, for example, $\delta_P$ has an actual value of 3.2, then the resulting offset for the particular value of $\delta_S(i_0)=-3$ is −0.2, which is (taking the absolute value) smaller than $S_0$. If $\delta_P=3.5$, the resulting offset will be −0.5, which is still within the desired range. If $\delta_P=3.6$ and $\delta_S(i)$ is still −3, the resultant offset will be −0.6, which is now too great; hence the correct value of $\delta_S$ will in this case be −4, yielding an acceptable resultant offset value of −0.4.

In addition to the frequency offset, there is another effect of non-ideal oscillators: the frequency drift. The output of the oscillators not only has an offset $\Delta f$, but this offset is also changing in time (drifting). It is:

$$\Delta \dot{f} = \frac{\partial \Delta f}{\partial t} = f_s \cdot \dot{\delta}_P \tag{2.6}$$

This effect is illustrated in FIG. 9 by the inclusion of two particular values of actual frequency offset $\delta_{P1}$ and $\delta_{P2}$. The actual offset without drift, 30, is, as might be expected, a horizontal line, whereas with drift the same characteristic assumes a gradient; this is the line 31. As shown, line 31 passes through region 32, which means that offset is being compensated for. However, line 33 shows another possible characteristic in which, because of drift, no region is being passed through, neither region 32 nor region 34. Under such circumstances frequency offset would remain uncompensated.

Figure 10:
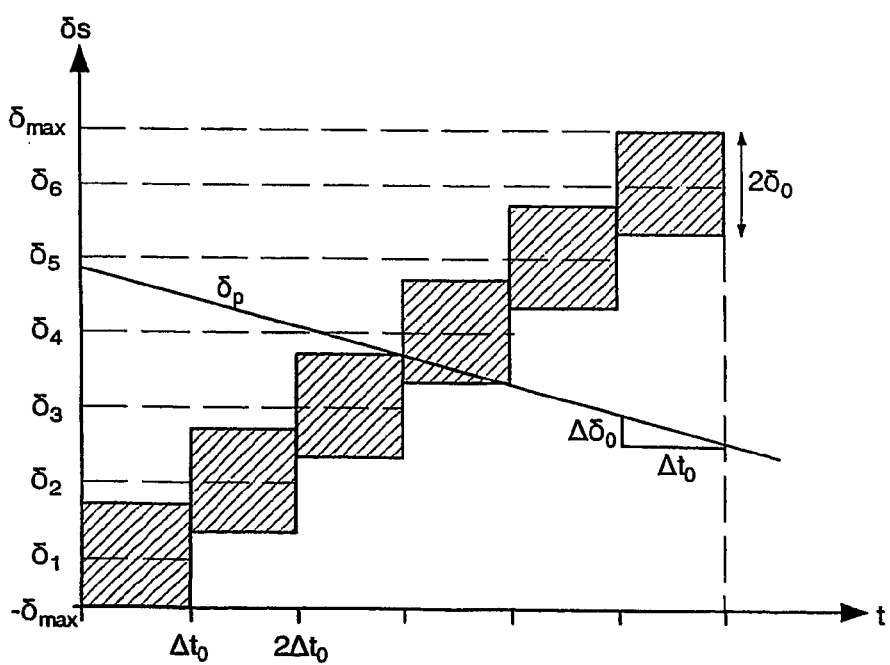

In order, in this situation, to "catch" the offset in one sweep excursion from $-\delta_{max} \ldots \delta_{max}$, the invention provides for the sweeping steps to be adapted so that the regions $\delta_S(i)-\delta_0 \ldots \delta_S(i)+\delta_0$ overlap, as shown now in FIG. 10. The overlapping $\Delta\delta_0$ has to satisfy the inequality:

$$\dot{\delta}_P = \frac{\Delta \dot{f}}{f_s} \leq \frac{\Delta \delta_0}{\Delta t_0} \tag{2.7}$$

where, as already mentioned, $\Delta t_0$ is the time needed to calculate $\phi_{ys}(n, \delta_S(i))$.

For examining the effect of a timing phase error on the output of the correlation receiver only the redundant path is of importance. The frequency offset is assumed to be zero. From FIG. 5, and ignoring $z_k$, we may write the received signal as a time-continuous function:

$$y(t) = \sum_{k=-\infty}^{\infty} s_k \cdot h_P(t - k \cdot T_A) \quad (2.8)$$

If y(t) is sampled with sampling time $T_A$ and phase error $\tau$, it follows that:

$$y_n = \quad (2.9)$$
$$y(n \cdot T_A + \tau) = \sum_{k=-\infty}^{\infty} s_k \cdot h_P[(n-k) \cdot T_A + \tau] = \sum_{l=-\infty}^{\infty} s_{n-l} \cdot h_P(l \cdot T_A + \tau)$$

From (2.9) we can see that the timing phase error leads to a modified impulse response of the transmission channel:

$$h'_{P1} = h'_P(lT_A) = h_P(lT_A + \tau) \quad (2.10)$$

$h_{P1}$ is the discrete impulse response of the passive transmission path, including all filters from the square-root Nyquist filter 13 at the transmitter to the similar filter 21 at the receiver (see FIG. 3).

The phase error appears to behave like a sampling phase error with the discrete-time representation of $h_P(t)$. We can therefore take it into account by making all calculations using $h'_{P1}$ instead of $h_{P1}$. The mean value of the correlator output will be:

$$|E[\phi_{ys}(n)]| = \sigma_S^2 \cdot |h_P(n \cdot T_A + \tau)| \quad (2.11)$$

Note, that the maximum phase error is $\tau_{max} = T_A/2$, so we may decrease $\tau$ by increasing the sampling rate. i.e. $\eta$.

Figure 11:
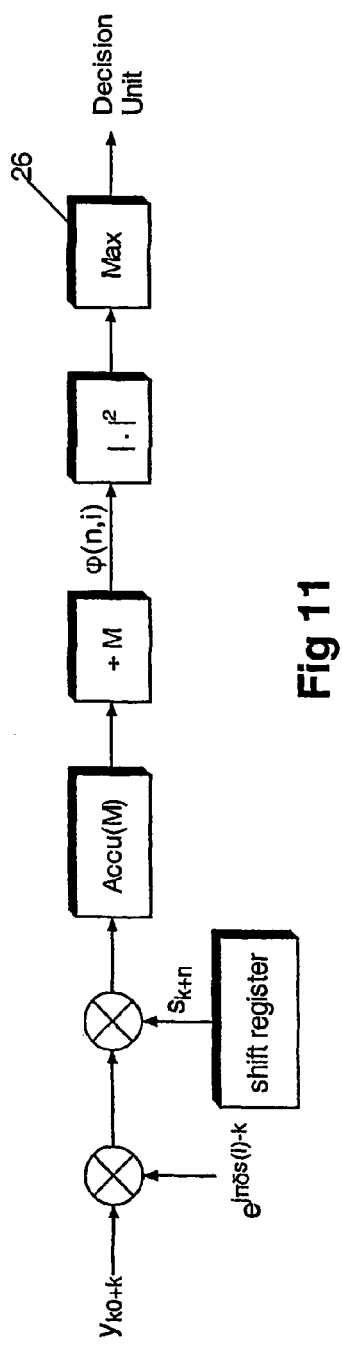
FIG. 11 is a block diagram depicting the correlation process that occurs in an embodiment of the invention.

As has been described above, in order to handle the frequency offset, the cross correlation of the received signal and the PN sequence has to be calculated for $N_d$ sweeping points, in addition to the $\eta N_{pn}$ "time" points. Thus, the correlation function is two-dimensional: $\phi_{ys}(-n, \delta_S(i)) = \phi(n, i)$, $n=0, \ldots \eta N_{pn}-1, i=1, \ldots N_d$. For this section, $\eta=2$ is assumed. FIG. 11 shows the principle of the correlation unit: the received signal $y_{k+k0}$ is rotated by a complex factor $\exp(j\pi\delta_S(i)k)$ and then multiplied by the over-sampled output of the same shift register, as in the transmitter. M values at a time are accumulated (M is the correlation length), the division by M giving the cross correlation:

$$\varphi(n, i) = \frac{1}{M} \cdot \sum_{k=0}^{M-1} y_{k_0+k} \cdot s^*_{k_0+k+n} \cdot \exp[j \cdot \pi \cdot \delta_s(i) \cdot k] = \varphi_{ys}[-n, \delta_s(i)] \quad (2.12)$$

There are two main ways of calculating $\phi(n, i)$: all serial or all parallel. All serial means that the points in the two dimensional space (n, i) are calculated one after another. All parallel means that all values of $\phi(n, i)$ are calculated at once. The all-serial method requires the least outlay in terms of hardware, but is slow; the all-parallel method is fast, but incurs greater hardware outlay. The preferred embodiment of the invention employs a compromise solution, in which calculations are carried out in a partly serial, partly parallel manner. This brings with it a trade-off between speed and outlay.

Figure 12:
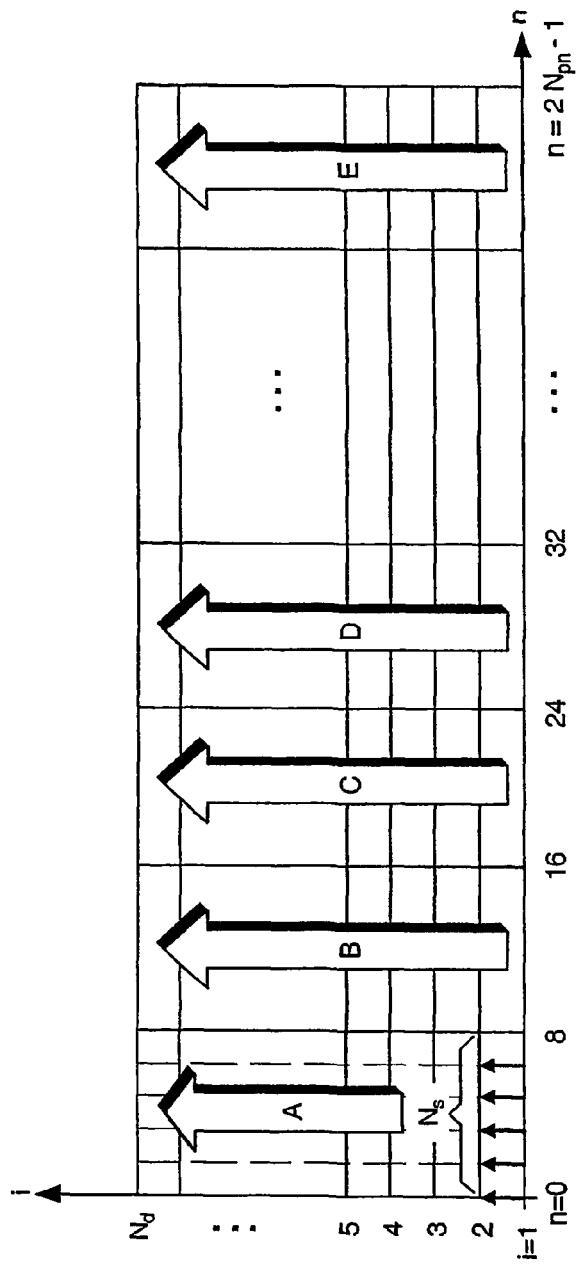
FIG. 12 shows a method of correlation which involves part-serial, part-parallel processing of data.

The scheme actually envisaged by the invention is shown schematically in FIG. 12. A first block of $N_S$ values of n is taken (in the example shown, $N_S=8$) and all $N_d$ values of i are calculated successively for this block. This is shown by the arrow A. Then the next block of $N_S$ time steps follows, in which again all $N_d$ values of i are calculated one after the other; this is the arrow B. The process continues until all $N_{pn}$ values of n have been covered.

Figure 13:
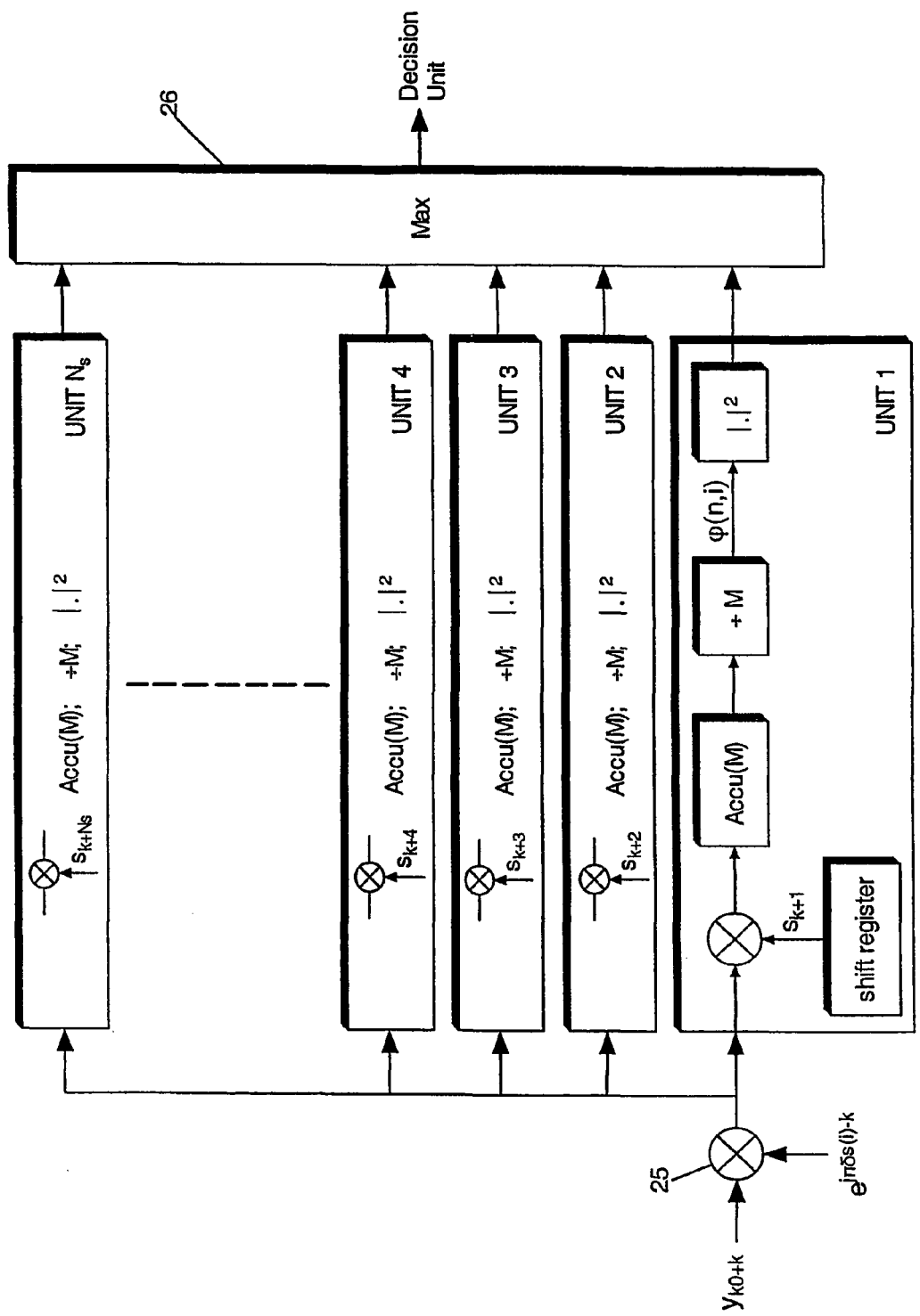
FIG. 13 is the block diagram of FIG. 11, expanded to include the serial/parallel correlation procedure illustrated in FIG. 12.

This serial/parallel scheme necessitates an amendment to the correlation calculation diagram shown in FIG. 11. In the amendment (see FIG. 13) the stages between the $\delta_S$ rotation operator 25 and the maximum-value block 26 are duplicated, one for each value of $\delta_S$. Hence there are $N_S$ blocks altogether, each fed from the rotation operator 25 and feeding the maximum-value block 26. The latter detects which of the units 1 . . . $N_S$ is outputting the greatest absolute value.

Figure 14:
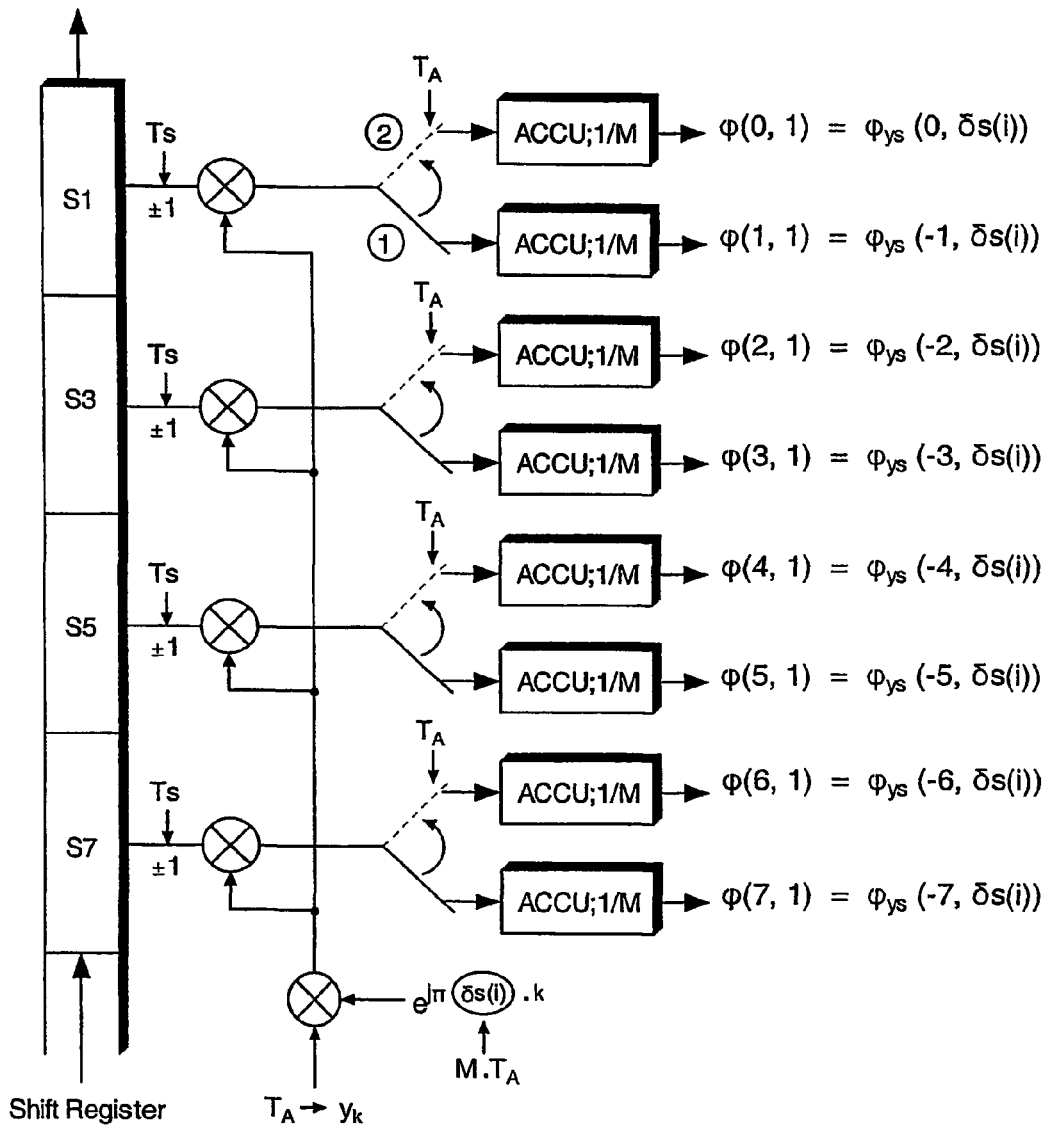
FIG. 14 is a diagram illustrating a particular structural realisation of the serial/parallel correlation technique.

A more detailed realisation of this same scheme is shown in FIG. 14, where again $N_S=8$. The figure illustrates the calculation of the first block ($n=0, \ldots N_S-1$) for $\delta_S(i)$. The shift register is synchronised with the symbol time $T_S=1/f_S$ and cycles continuously with period $N_{pn}$. For the calculation of the first $N_S$ time steps, the first $N_S/2$ (i.e. 4) values of the shift register are read out.

Since the PN sequence is oversampled by $\eta=2$, every second value of $s_k$ is zero and does not have to be multiplied by $r_k$. To take this into account, switches are provided before the accumulators, which are synchronised by the sampling time $T_A=T_S/2$, where $T_S$ is the symbol time. After a time $MT_A$ the contents of the $N_S$ accumulators are divided by M, giving the correlations. Out of every $N_S$ correlation values the maximum of their squared absolute value is calculated (alternatively, the absolute value alone may be calculated, but its square has the advantage of incurring less hardware outlay) and compared with the stored maximum of the previous sequence of $N_S$ correlation values. The larger value is then kept as the new maximum. The accumulators are set to zero and $\delta_S$ takes on the next value. After $t=MT_A N_d$, $\delta_S$ again assumes its first value and the next block of $N_S/2$ outputs of the shift register is read out. By comparing the maximum of all correlator outputs (i.e. their squared absolute value) with a given threshold, a decision can be formed as to whether the SS signal has been sent or not.

The described principle of monitoring a redundant transmitter by a SS signal can be used for point-to-point systems as well as for point-to-multipoint systems. However, in point-to-multipoint systems the following additional and beneficial feature can be introduced. At each terminal within a sector the correlation and detection unit described above is provided. Each terminal makes a decision as to whether the SS signal is present or not and the decision is transmitted to the base station. Only if a predetermined number of terminals indicated that the SS signal had not been received is an alarm then given to the network management system. Preferably the alarm is only given where at least half of all the terminals gave a negative report, i.e. majority voting. Such averaging over all the terminals allows the requirements of the correlator in each terminal to be relaxed (the correlation length may be reduced, for example), without reducing the reliability of the supervision.

The invention claimed is:

1. A method of monitoring a redundant transmitter of a radio communications system having an active transmitter for transmitting data signals to at least one receiver, the method comprising the steps of:

a) during normal operation, transmitting over the redundant transmitter a spread-spectrum signal within a frequency band of the data signals, said spread-spectrum signal being of low spectral power in comparison with said data signals; and b) at said at least one receiver, detecting a presence of the spread-spectrum signal, an absence of the spread-spectrum signal being taken to indicate non-integrity of the redundant transmitter;

c) wherein the detecting step is performed by a process of cross-correlation, the spread-spectrum signal being provided by feeding the redundant transmitter with a first pseudo-noise signal, and the cross-correlation being performed between a received signal and a second pseudo-noise signal, the second pseudo-noise signal having the same characteristics as the first pseudo-noise signal, the first pseudo-noise signal passing through the same components in the redundant transmitter as would the data signals, were the redundant transmitter called upon to take over from the active transmitter.

2. The method as claimed in claim 1, wherein, in order to compensate for a timing phase error in respect of the spread-spectrum signal, the step of oversampling of the received signal is performed in the at least one receiver.

3. The method as claimed in claim 2, wherein, in order to compensate for the effects of a frequency offset existing between the active and redundant transmitters and to take into account a narrow allowable window of offset which the correlation of a long pseudo-noise sequence can tolerate, the received signal is subjected to a stepped sweeping step, wherein a received function is multiplied by a complex factor having the form $\exp\{j2\pi k\delta_S/\eta\}$, where k is a sampling index, $\eta$ is an oversampling factor, and $\delta_S$ are sweeping steps, scaled by a symbol rate.

4. The method as claimed in claim 3, wherein the sweeping steps are chosen such as to cover all values of the frequency offset.

5. The method as claimed in claim 4, wherein the sweeping steps are chosen such as to compensate for a drift of the frequency offset with time.

6. The method as claimed in claim 5, wherein the cross-correlation is two-dimensional, being calculated for all sweeping steps $\delta_S$ and for $\eta N_{pn}$ time steps, where $\eta$ is the oversampling factor, and $N_{pn}$ is a length of the pseudo-noise sequence.

7. The method as claimed in claim 6, wherein a maximum of an absolute value of a cross-correlation result is employed to determine the integrity of the redundant transmitter.

8. The method as claimed in claim 6, wherein a maximum of a squared absolute value of a cross-correlation result is employed to determine the integrity of the redundant transmitter.

9. The method as claimed in claim 6, wherein a correlation calculation is performed by a part-serial, part-parallel processing of the sampled data.

10. The method as claimed in claim 9, wherein said processing includes processing a first group ($N_S$) of the $\eta N_{pn}$ points in parallel for successive values of $\delta_S$, then processing a second group ($N_S$) of the $\eta N_{pn}$ points in parallel for successive values of $\delta_S$, and so on until all $\eta N_{pn}$ points have been covered.

11. The method as claimed in claim 10, wherein the radio communications system comprises at least two receivers, each of which provides an indication of the presence or absence of the spread-spectrum signal, the decision as to the non-integrity of the redundant transmitter being taken on the basis of the indications of a predetermined number of the at least two receivers.

12. The method as claimed in claim 11, wherein the decision is taken on the basis of a majority vote.

13. The method as claimed in claim 11, wherein the radio communications system comprises one receiver, and the indication of non-detection of the spread-spectrum signal at that receiver is taken as an indication of the non-integrity of the redundant transmitter.

14. The method as claimed in claim 11, wherein the radio communications system is a point-to-multipoint system, the active and redundant transmitters being part of a base station, and the receivers being terminal stations, of that point-to-multipoint system.

15. The method as claimed in claim 14, wherein the point-to-multipoint system is one of a group comprising: a TDM/TDMA system, an FDM/FDMA system and a CDM/CDMA system.

16. An apparatus for monitoring a redundant transmitter of a radio transmission system having an active transmitter for transmitting data signals to at least one receiver, the apparatus comprising:

a) means for generating a first pseudo-noise signal;

b) means for applying said first pseudo-noise signal to an input of the redundant transmitter, the redundant transmitter thereby transmitting a spread-spectrum signal having a low spectral power in comparison with said data signals;

c) means in said at least one receiver, for detecting a presence of the spread-spectrum signal; and d) correlator means in the at least one receiver, for cross-correlation of a received signal, the cross correlation being performed between a received signal and a second pseudo-noise signal, the second pseudo-noise signal having the same characteristics as the first pseudo-noise signal, the first pseudo-noise signal passing through the same components in the redundant transmitter as would the data signals, were the redundant transmitter called upon to take over from the active transmitter.

17. The apparatus as claimed in claim 16, comprising a sweeping means for subjecting the received signal to a frequency-sweeping operation, the sweeping means comprising a multiplier means for multiplying the received signal by a complex factor having the form $\exp\{j2\pi k\delta_S/\eta\}$, where k is a sampling index, $\eta$ is an oversampling factor, and $\delta_S$ are sweeping steps, scaled by a symbol rate.

18. The apparatus as claimed in claim 17, wherein the correlator means is connected to a maximum-deriving means for deriving a maximum value of a correlator output.

19. The apparatus as claimed in claim 18, wherein the maximum-deriving means is operative to derive a maximum of an absolute value of the correlator output.

20. The apparatus as claimed in claim 18, wherein the maximum-deriving means is operative to derive a maximum of a square of an absolute value of the correlator output.

21. The apparatus as claimed in claim 16, and comprising an oversampling means in the at least one receiver, for compensation of a timing phase error in respect of the spread-spectrum signal.

22. A radio communications system, comprising: an active transmitter; a redundant transmitter; at least two receivers for receiving data signals transmitted by the active transmitter; and an apparatus for monitoring the redundant transmitter, the apparatus including:

a) means for generating a first pseudo-noise signal;
b) means for applying said first pseudo-noise signal to an input of the redundant transmitter, the redundant transmitter thereby transmitting a spread-spectrum signal having a low spectral power in comparison with said data signals;
c) means in said at least two receivers, for detecting a presence of the spread-spectrum signal; and
d) correlator means in the at least one receiver, for cross-correlation of a received signal, the cross correlation being performed between a received signal and a second pseudo-noise signal, the second pseudo-noise signal having the same characteristics as the first pseudo-noise signal, the first pseudo-noise signal passing through the same components in the redundant transmitter as would the data signals, were the redundant transmitter called upon to take over from the active transmitter.

23. The system as claimed in claim 22, wherein the monitoring apparatus comprises a decision-making means fed by indications of redundant-transmitter integrity delivered by the receivers.

24. The system as claimed in claim 23, wherein the decision-making means makes a decision on the basis of majority voting among the receivers.

25. The system as claimed in claim 24, wherein the system is a point-to-multipoint system.

26. The system as claimed in claim 25, wherein the system is one of a group comprising: a TDM/TDMA system, an FDM/FDMA system and a CDM/CDMA system.

27. The system as claimed in claim 22, and comprising an oversampling means in the at least one receiver, for compensation of a timing phase error in respect of the spread-spectrum signal.

* * * * *

UNITED STATES PATENT AND TRADEMARK OFFICE
CERTIFICATE OF CORRECTION

| | | |
|---|---|---|
| PATENT NO. | : 7,773,661 B2 | Page 1 of 1 |
| APPLICATION NO. | : 10/482794 | |
| DATED | : August 10, 2010 | |
| INVENTOR(S) | : Hofmann et al. | |

It is certified that error appears in the above-identified patent and that said Letters Patent is hereby corrected as shown below:

On the Face Page, in Field (56), under "OTHER PUBLICATIONS", in Column 1, Lines 1-2, delete "Ir. J. Meel, "introduction to spread spectrum (SS)", Nov. 1997-Nov. 1999, Sirius communication, pp. 2-13.*".

In Column 6, Line 24, delete "$(\pi\delta M/\eta/(\pi\delta M/\eta)$" and insert -- $(\pi\delta M/\eta)/(\pi\delta M/\eta)$ --, therefor.

In Column 8, Line 9, delete "$\eta$" and insert -- n --, therefor.

In Column 8, Line 28, delete "$S_0.$" and insert -- $\delta_0.$ --, therefor.

In Column 9, Line 24, in Equation (2.10), delete "$h'_{P1}$" and insert -- $h'_{PI}$ --, therefor.

In Column 9, Line 26, delete "$h_{P1}$" and insert -- $h_{PI}$ --, therefor.

In Column 9, Line 33, delete "$h'_{PI}$ instead of $h_{p1}.$" and insert -- $h'_{PI}$ instead of $h_{p1}.$ --, therefor.

Signed and Sealed this
Fifteenth Day of February, 2011

David J. Kappos
*Director of the United States Patent and Trademark Office*